(12) United States Patent
Cheong et al.

(10) Patent No.: US 11,166,141 B2
(45) Date of Patent: Nov. 2, 2021

(54) ELECTRONIC DEVICE AND METHOD FOR DISPLAYING INQUIRY LIST OF EXTERNAL ELECTRONIC DEVICE IN BLUETOOTH™ NETWORK ENVIRONMENT

(71) Applicant: Samsung Electronics Co., Ltd., Gyeonggi-do (KR)

(72) Inventors: Gupil Cheong, Gyeonggi-do (KR); Jesus Manuel Perez Pueyo, Gyeonggi-do (KR); Doosuk Kang, Gyeonggi-do (KR); Bokun Choi, Gyeonggi-do (KR); Sungjun Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/872,980

(22) Filed: May 12, 2020

(65) Prior Publication Data
US 2020/0396581 A1 Dec. 17, 2020

(30) Foreign Application Priority Data
Jun. 11, 2019 (KR) .......................... 10-2019-0068551

(51) Int. Cl.
*H04W 4/80* (2018.01)
*H04W 72/00* (2009.01)
(Continued)

(52) U.S. Cl.
CPC ............ *H04W 4/80* (2018.02); *H04B 17/318* (2015.01); *H04L 67/06* (2013.01); *H04W 4/50* (2018.02);
(Continued)

(58) Field of Classification Search
CPC combination set(s) only.
See application file for complete search history.

(56) References Cited

U.S. PATENT DOCUMENTS 6,876,643 B1 * 4/2005 Aggarwal ............. H04W 8/005
370/254
7,860,459 B2 12/2010 Jeong
(Continued)

OTHER PUBLICATIONS

International Search Report dated Aug. 14, 2020 issued in counterpart application No. PCT/KR2020/005577, 10 pages.

*Primary Examiner* — Junpeng Chen
(74) *Attorney, Agent, or Firm* — The Farrell Law Firm, P.C.

(57) ABSTRACT

An electronic device includes a display, a wireless communication circuit configured to support a protocol capable of short-range wireless communication between electronic devices, at least one processor operatively connected with the display and the wireless communication circuit, and a memory operatively connected to the at least one processor, wherein the memory is configured to store instructions that, when executed, cause the at least one processor to broadcast a first control packet used for an inquiry procedure through the wireless communication circuit, receive a plurality of second control packets in response to the first control packet through the wireless communication circuit, identify a plurality of clock values in the plurality of second control packets, and display, on the display, a user interface indicating inquiry results of a plurality of external electronic devices that transmitted the plurality of second control packets based on the plurality of clock values.

20 Claims, 16 Drawing Sheets

(51) Int. Cl.
*H04W 56/00* (2009.01)
*H04B 17/318* (2015.01)
*H04W 4/50* (2018.01)
*H04W 76/10* (2018.01)
*H04W 8/00* (2009.01)
*H04L 29/08* (2006.01)

(52) U.S. Cl.
CPC ......... *H04W 8/005* (2013.01); *H04W 56/001* (2013.01); *H04W 72/005* (2013.01); *H04W 76/10* (2018.02)

(56) References Cited

U.S. PATENT DOCUMENTS

| | | | |
|---|---|---|---|
| 2006/0094402 A1* | 5/2006 | Kim | H04W 12/50 455/411 |
| 2008/0194205 A1* | 8/2008 | Kusakari | H04B 17/318 455/67.7 |
| 2011/0143666 A1* | 6/2011 | Lee | H04M 1/27453 455/41.2 |
| 2012/0289158 A1* | 11/2012 | Palin | H04W 8/005 455/41.2 |
| 2012/0328061 A1 | 12/2012 | Chow | |
| 2013/0189924 A1 | 7/2013 | Pedro et al. | |
| 2016/0219406 A1* | 7/2016 | Hibara | H04W 4/80 |
| 2016/0277873 A1 | 9/2016 | Park et al. | |
| 2016/0278151 A1 | 9/2016 | Kwon et al. | |
| 2018/0152806 A1 | 5/2018 | Zhang et al. | |
| 2020/0162848 A1 | 5/2020 | Zhang et al. | |
| 2021/0152976 A1* | 5/2021 | Daoura | H04W 4/80 |

\* cited by examiner

ELECTRONIC DEVICE AND METHOD FOR DISPLAYING INQUIRY LIST OF EXTERNAL ELECTRONIC DEVICE IN BLUETOOTH™ NETWORK ENVIRONMENT

CROSS-REFERENCE TO RELATED APPLICATIONS

This application is based on and claims priority under 35 U.S.C. § 119 to Korean Patent Application No. 10-2019-0068551, filed on Jun. 11, 2019, in the Korean Intellectual Property Office, the entire disclosure of which is incorporated herein by reference.

BACKGROUND

1. Field

The disclosure relates to an electronic device and a method for displaying an inquiry list of external electronic devices in a Bluetooth™ network environment.

2. Description of Related Art

A Bluetooth™ standard technology defined by a Bluetooth™ special interest group (SIG) defines a protocol for short-range wireless communication between electronic devices. In a Bluetooth™ network environment, the electronic devices may transmit or receive data packets containing a content such as text, voice, images, or video in a specified frequency band (e.g., about 2.4 gigahertz (GHz)).

For example, a user equipment (UE) such as a smartphone, a tablet computer, a desktop computer, or a laptop computer may transmit data packets to another UE or an accessory device. The accessory device may include, for example, at least one of an earphone, a headset, a wearable device, a speaker, a mouse, a keyboard, and/or a display device.

In a topology representing a Bluetooth™ network environment, an electronic device may inquire of at least one external electronic device and display an inquiry result through a display. Because the electronic device may perform an inquiry for a plurality of external electronic devices for a specified time, the electronic device may display an inquiry list including the plurality of inquired external electronic devices.

The electronic device may establish a link based on a Bluetooth™ protocol with an external electronic device desired by a user among the plurality of inquired external electronic devices. For example, after displaying the inquiry list through the display, the electronic device may receive a user input of selecting at least one of the plurality of external electronic devices included in the inquiry list. The electronic device may establish a link with at least one external electronic device selected by a user input.

As the number of external electronic devices inquired of by the electronic device increases, the number of external electronic devices included in the inquiry list increases. Legibility or visibility of the inquiry list may be lowered for the user. For example, when the external electronic device desired by the user is displayed at a low rank in the inquiry list, the user may misunderstand that the external electronic device desired by the user has not been normally inquired, or a time it takes for the user to discover the external electronic device may increase.

SUMMARY

An aspect of the disclosure provides an electronic device. The electronic device includes a display, a wireless communication circuit configured to support a protocol capable of short-range wireless communication between electronic devices, at least one processor operatively connected with the display and the wireless communication circuit, and a memory operatively connected to the at least one processor, wherein the memory is configured to store instructions that, when executed, cause the at least one processor to broadcast a first control packet used for an inquiry procedure through the wireless communication circuit, receive a plurality of second control packets in response to the first control packet through the wireless communication circuit, identify a plurality of clock values in the plurality of second control packets, and display, on the display, a user interface indicating inquiry results of a plurality of external electronic devices that transmitted the plurality of second control packets based on the plurality of clock values.

Another aspect of the disclosure provides an electronic device. The electronic device includes a wireless communication circuit configured to support a protocol capable of short-range wireless communication between electronic devices, enable an inquiry mode based on the protocol, set, to a specified value, a clock value of the electronic device in operation from when the inquiry mode is enabled in response to an occurrence of a specified event, receive a first control packet used for an inquiry procedure from an external electronic device, identify the clock value of the electronic device operating from the specified value in response to receiving the first control packet, and transmit a second control packet including the clock value to the external electronic device.

Another aspect of the disclosure provides a method of an electronic device. The method includes broadcasting a first control packet used for an inquiry procedure based on a protocol capable of short-range wireless communication between electronic devices, receiving a plurality of second control packets in response to the first control packet, identifying a plurality of clock values in the plurality of second control packets, and displaying a user interface indicating inquiry results of a plurality of external electronic devices that transmitted the plurality of second control packets based on the plurality of clock values.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Hereinafter, the present disclosure is described with reference to the accompanying drawings. Various embodiments of the disclosure used herein are not intended to limit the disclosure to specific embodiments, and it should be understood that the embodiments include modifications, equivalents, and/or alternatives of the embodiments described herein.

Figure 1:
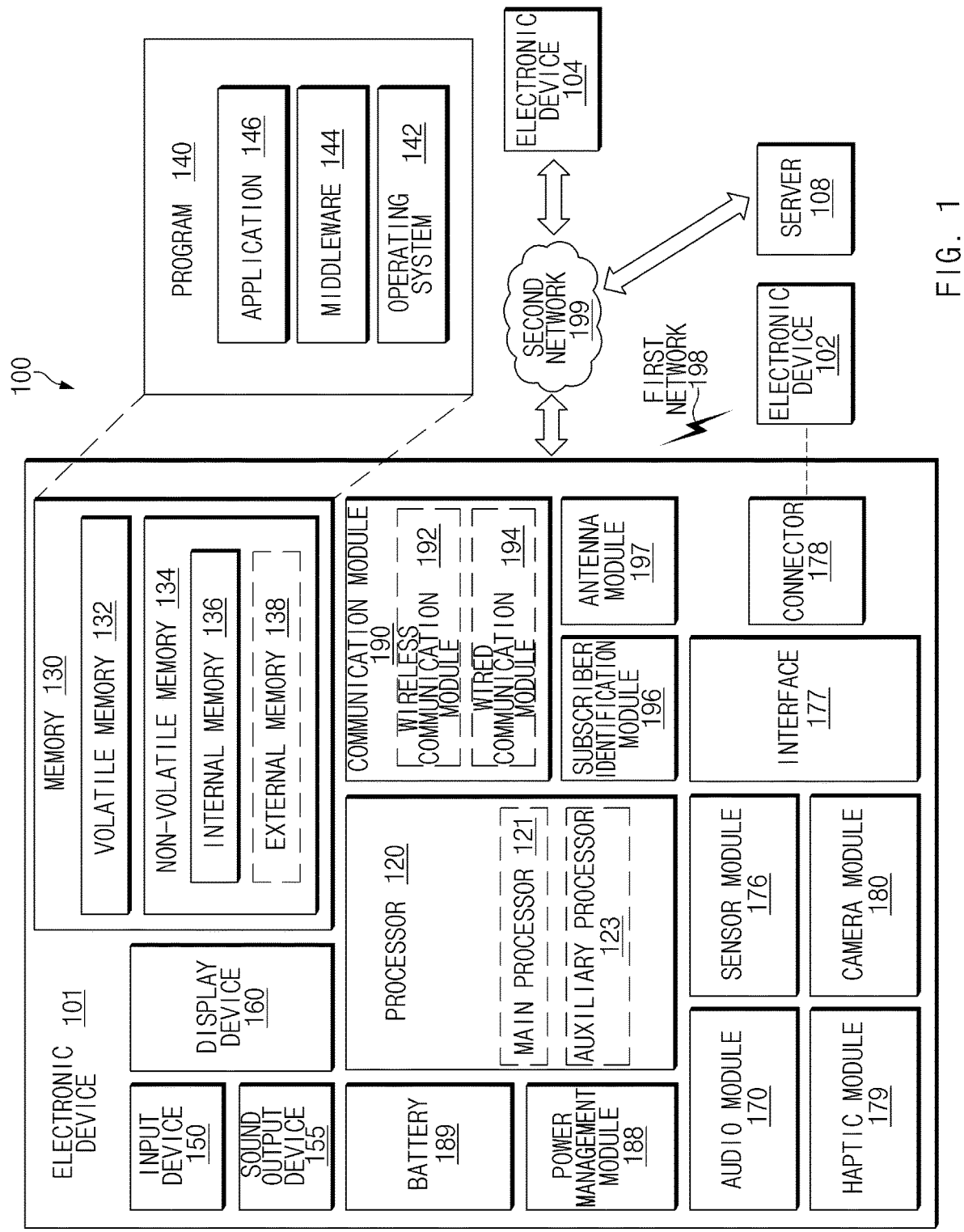
FIG. 1 is a block diagram of an electronic device in a network environment according to an embodiment.

FIG. 1. is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction. with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101 The electronic device 101 may provide the outcome, with or without further processing of the outcome, as at least part of a reply to the request. To that end, a cloud computing, distributed computing, or client-server computing technology may be used, for example.

Figure 2:
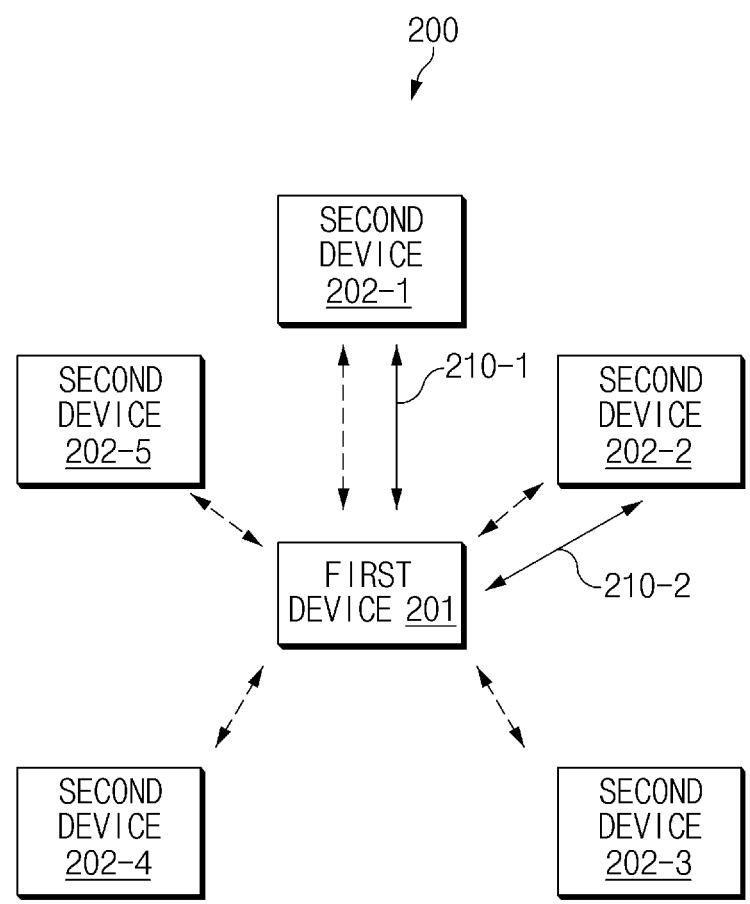
FIG. 2 is a block diagram of a topology of a Bluetooth™ network environment according to an embodiment.

FIG. 2 is a block diagram of a topology 200 of a Bluetooth™ network environment according to an embodiment.

Referring to FIG. 2, a first device 201 and second devices 202-1, 202-2, 202-3, 202-4, and 202-5 included in the topology 200 may perform functions the same as, or similar to, the functions of the electronic device 101, and may include components the same as, or similar to, the components of the electronic device 101. For example, the first device 201 and the second devices 202-1, 202-2, 202-3, 202-4, and 202-5 may include a user equipment such as a smartphone, a tablet computer, a desktop computer, or a laptop computer, or an accessory device such as an earphone, a headset, a speaker, a mouse, a keyboard, or a display device.

The first device 201 and the second devices 202-1, 202-2, 202-3, 202-4, and 202-5 may include a wireless communication circuit that supports a Bluetooth™ protocol defined by a Bluetooth™ SIG. In this case, the wireless communication circuit may include at least one of a Bluetooth™ module and/or a Bluetooth™ chip. The Bluetooth™ protocol may include, for example, a Bluetooth™ legacy protocol and a BLE protocol. The wireless communication circuit may support one or two of the Bluetooth™ legacy protocol and the BLE protocol.

The first device 201 may be connected to at least one of the second devices 202-1, 202-2, 202-3, 202-4, and 202-5 based on the Bluetooth™ protocol to provide various services to a user. For example, when at least one second devices 202-1, 202-2, 202-3, 202-4, or 202-5 connected to the first device 201 is the accessory device, the first device 201 may provide at least one function of healthcare, hands-free calling, media playback, file sharing, and/or notification through the at least one of the connected second devices 202-1, 202-2, 202-3, 202-4, or 202-5.

Before the first device 201 is connected with one of the at least one second devices 202-1, 202-2, 202-3, 202-4, or 202-5, the first device 201 may perform an inquiry procedure (or a scan procedure) based on the Bluetooth™ protocol to discover another person's device in a vicinity. The first device 201 may inquire (or discover) the second devices 202-1, 202-2, 202-3, 202-4, and 202-5 through the inquiry procedure for a specified time. For example, the first device 201 may transmit an identification (ID) packet including an inquiry access code (IAC) based on the Bluetooth™ legacy protocol at a specified period, and receive an FHS packet responding to the ID packet from the second devices 202-1, 202-2, 202-3, 202-4, and 202-5. For example, the first device 201 may receive an advertising packet or a scan response (SCAN_RSP) packet based on the BLE protocol from the second devices 202-1, 202-2, 202-3, 202-4, and 202-5.

Figure 3:
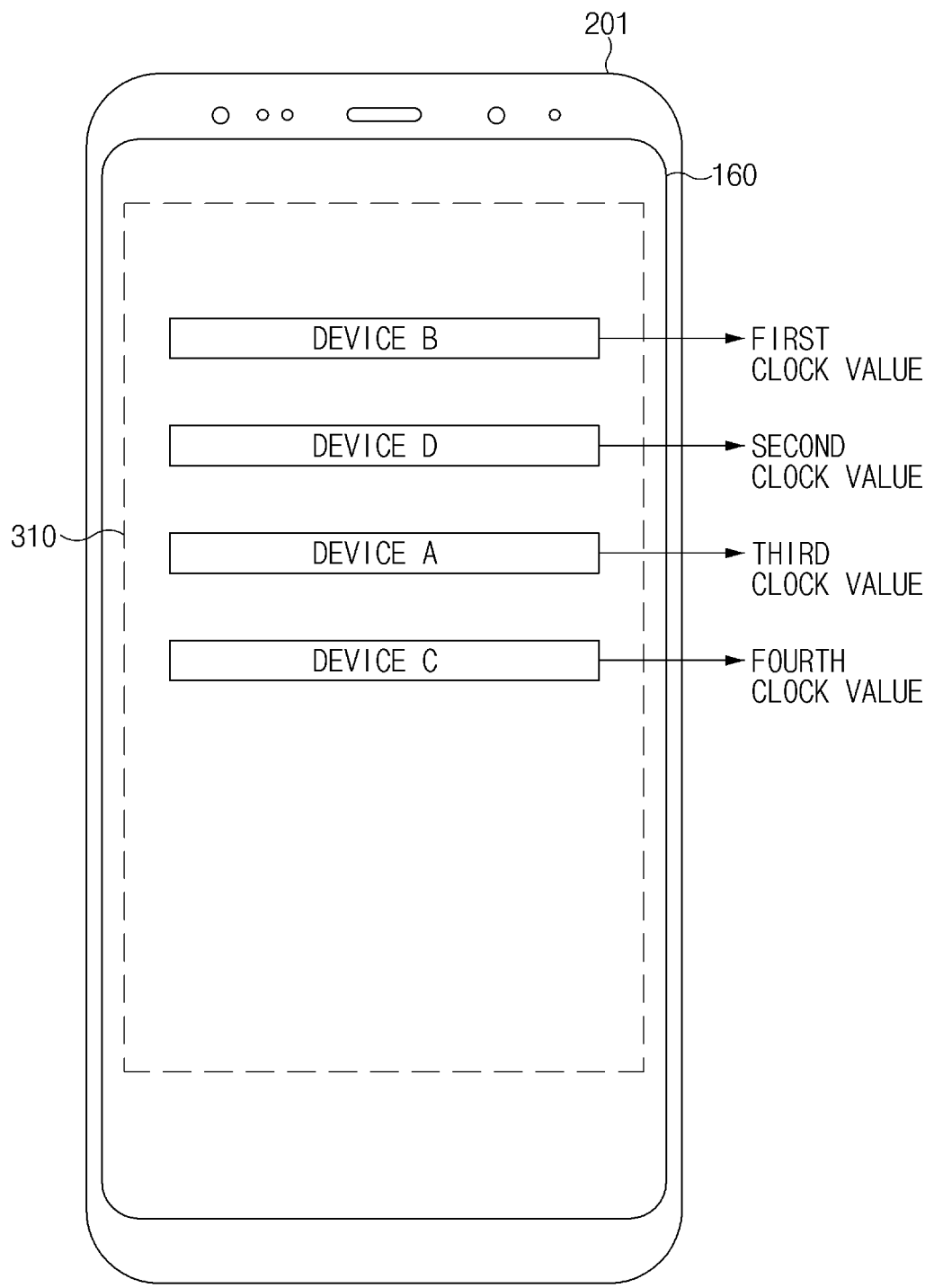
FIG. 3 is an illustration of a user interface representing inquiry results according to an embodiment.
Figure 4:
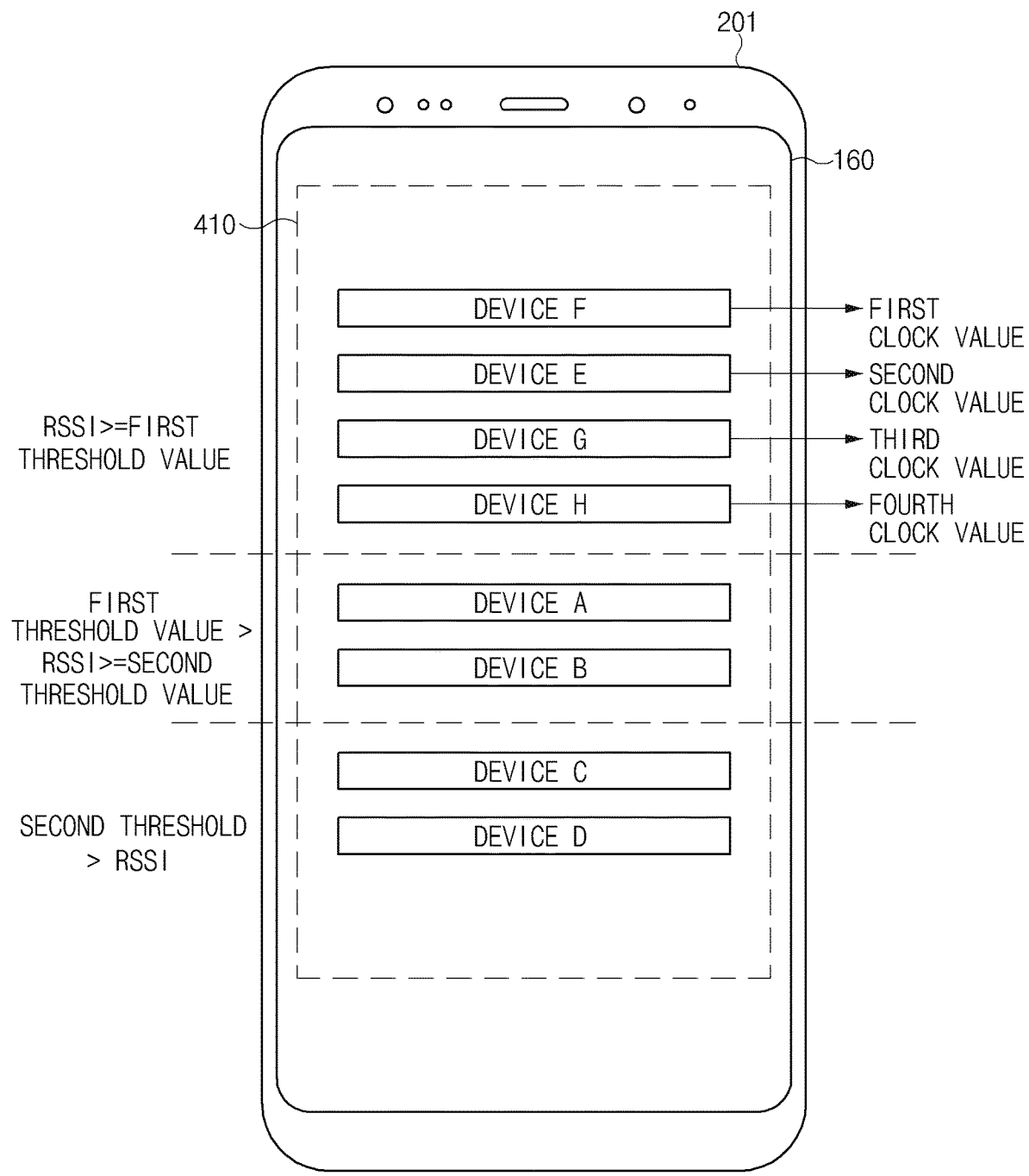
FIG. 4 is an illustration of a user interface representing inquiry results according to an embodiment.

As shown in FIG. 3 or FIG. 4 described below in greater detail, the first device 201 may output an inquiry list indicating inquiry results of the second devices 202-1, 202-2, 202-3, 202-4, and 202-5 through the display device 160.

The first device 201 may establish a link 210-1 or 210-2 with at least one second device 202-1 or 202-2, respectively, selected by a user input among the second devices 202-1, 202-2, 202-3, 202-4, and 202-5 included in the inquiry list, and transmit or receive data through the established link. At least one of the second devices 202-3, 202-4, and 202-5 that does not establish the link with the first device 201 may monitor (or sniff) the link 210-1 or 210-2 established between the first device 201 and another second device 202-1 or 202-2 to receive the data from the first device 201. In this case, the at least one of the other second devices 202-3, 202-4, or 202-5 may receive information (e.g., frequency channel information and address information) associated with the link 210-1 or 210-2 from the second device 202-1 or 202-2, and monitor the link using the received information.

FIGS. 3 and 4 illustrate user interfaces 310 and 410 representing inquiry results according to embodiments.

Referring to FIG. 3, the first device 201 may output the user interface 310 that indicates inquiry results of the second devices 202-1, 202-2, 202-3, 202-4, and 202-5 through the display device 160 to inform the user of an external electronic device that may establish a link with the first device 201. For example, the user interface 310 may have a form of a list in which the inquiry results of the second devices 202-1, 202-2, 202-3, 202-4, and 202-5 are listed in a specified direction (e.g., in a downward direction).

The first device 201 may indicate the inquiry results of the second devices 202-1, 202-2, 202-3, 202-4, and 202-5 using information included in the FHS packet, the advertising packet, or the scan response packet received during performing the inquiry procedure. For example, the user interface 310 may include information that may identify a class of type (COD) (e.g., a type of a device), a device name (e.g., device A, device B, device C, or device D), a manufacturer's name, a Bluetooth™ address, or the second devices 202-1, 202-2, 202-3, 202-4, and 202-5 included in the FHS packet, the advertising packet, or the scan response packet, The first device 201 may display the plurality of inquired second devices 202-1, 202-2, 202-3, 202-4, and 202-5 sequentially and descendingly based on specified conditions. The specified conditions may be based on, for example, at least one of a received signal strength (e.g., received signal strength indicator (RSSI)) of the FHS packet, the advertising packet, or the scan response packet received from the plurality of second devices, an alphabetical order of the device names, the type of the device, and/or a clock value.

When the first device 201 displays the inquiry results of the second devices 202-1, 202-2, 202-3, 202-4, and 202-5 sequentially based on the received signal strength, because a strength of a transmitted signal of one of the second devices 202-1, 202-2, 202-3, 202-4, and 202-5 such as a laptop computer that is always supplied with power may be high, where an inquiry result of the laptop computer may be displayed above an inquiry result of one of the second devices 202-1, 202-2, 202-3, 202-4, and 202-5 (e.g., the earphone) that the user wants to use. In this case, legibility or visibility of the second device that the user wants to use may be low for the user.

The first device 201 may display the inquiry results sequentially based on clock values of the second devices 202-1, 202-2, 202-3, 202-4, and 202-5. For example, when an order of differences between clock values and a specified value is a first clock value, a second clock value, a third clock value, and a fourth clock value, from the smallest difference to the largest difference, and when device A has the third clock value, device B has the first clock value, device C has the fourth clock value, and device D has the second clock value, the first device 201 may output the inquiry results of the second devices 202-1, 202-2, 202-3, 202-4, and 202-5 sequentially and descendingly in an order of device B, device D, device A, and device C. Because a CLKN (a native clock) based on the Bluetooth™ protocol starts to operate at a point in time when the wireless communication circuit that supports the Bluetooth™ protocol is powered on, it may indicate that one of the second devices 202-1, 202-2, 202-3, 202-4, and 202-5 whose value indicated by the CLKN is close to 0×00 is a device in which the wireless communication circuit is turned on to be used by the user (or to be connected to the first device 201). For example, because one of the second devices 202-1, 202-2, 202-3, 202-4, and 202-5 that receives the user input among the second devices 202-1, 202-2, 202-3, 202-4, and 202-5 may change an operating clock to a specified value, it may indicate that one of the second devices 202-1, 202-2, 202-3, 202-4, and 202-5 whose clock value is close to the specified value is a device to be connected to the first device 201.

Referring to FIG. 4, the first device 201 may output inquiry results in consideration of at least one condition of the clock values of the second devices 202-1, 202-2, 202-3, 202-4, and 202-5, the received signal strength, the alphabetical order indicating the device names, and/or the types of the devices. For example, the first device 201 may sort a first group (e.g., a device E, a device F, a device G, and a device H) having a received signal strength greater than or equal to a first threshold value (e.g., −65 dBm), a second group (e.g., device A and device B) having a received signal strength less than the first threshold and greater than or equal to a second threshold (e.g., −80 dBm), and a third group having a received signal strength less than the second threshold (e.g., device C and device D). Thereafter, the first device 201 may align the devices included in each group in an alphabetical order of the device names. Thereafter, the first device 201 may display an inquiry result of a device (e.g., device F) having a clock value close to the specified value among the inquired second devices 202-1, 202-2, 202-3, 202-4, and 202-5 at the top. Although FIG. 4 illustrates an embodiment in which the first device 201 displays the inquired second devices sequentially in an order of the received signal strengths, in alphabetical order of the device names, and in an order of the clock values among the specified conditions, an order in which the specified conditions are considered is merely an example, and the order in which the specified conditions are considered may be changed. Further, FIG. 4 illustrates an embodiment using a plurality of threshold values (e.g., the first threshold value and the second threshold value). However, the first device 201 may display the inquired second devices 202-1, 202-2, 202-3, 202-4, and 202-5 sequentially using one threshold value (e.g., one of the first threshold value and the second threshold value).

When another of the second devices 202-1, 202-2, 202-3, 202-4, and 202-5 is additionally inquired of while the user interface 310 or 410 indicating the inquiry results is being output, the first device 201 may update the inquiry list based on the specified conditions. For example, in FIG. 3, when one of the second devices 202-1, 202-2, 202-3, 202-4, and 202-5 (e.g., device X) having a fifth clock value closer to the specified value than the first clock value is inquired while the user interface 310 is displayed, the first device 201 may display an inquiry result of device X above the inquiry result of device B.

Figure 5:
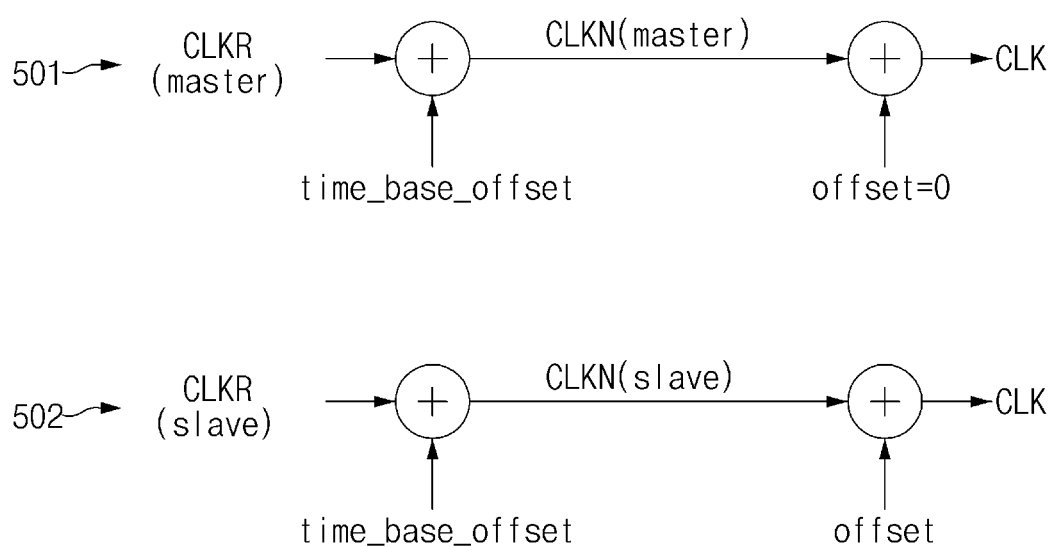
FIG. 5 is an illustration of a clock based on a Bluetooth™ protocol according to an embodiment.

FIG. 5 is an illustration of a clock based on a Bluetooth™ protocol according to an embodiment.

Referring to FIG. 5, the electronic device that supports the Bluetooth™ protocol may serve as a master device or a slave device. A clock 501 of the master device is defined in a Bluetooth™ standard, and a clock 502 of the slave device is defined in the Bluetooth™ standard.

The master device and the slave device may align packet transmission and reception points in time based on the clock. The clock based on the Bluetooth™ protocol may include a reference clock (CLKR), a native clock (CLKN), an estimated clock (CLKE), and a master clock (CLK). The CLKR is a system clock generated from a system of the electronic device, which may be a reference for other clocks. The CLKN may start from 0×0 with reference to the CLKR at the point in time when the wireless communication circuit is powered on. For example, the master and slave devices may operate the CLKN by applying a time_base_offset to the CLKR.

The CLK may be used for synchronization between the electronic devices. In this case, a channel resource (e.g., a frequency hopping channel) for transmitting the packet may be generated based on the CLKN of the master device. In a Bluetooth™ legacy network, a time resource (e.g., a time slot) may be determined based on the CLKN of the master device. The time slot may be, for example, 625 us (microseconds). The slave device is synchronized by applying an offset to the CLKN of the master device, and the CLKN of the master device may be CLK.

Figure 6:
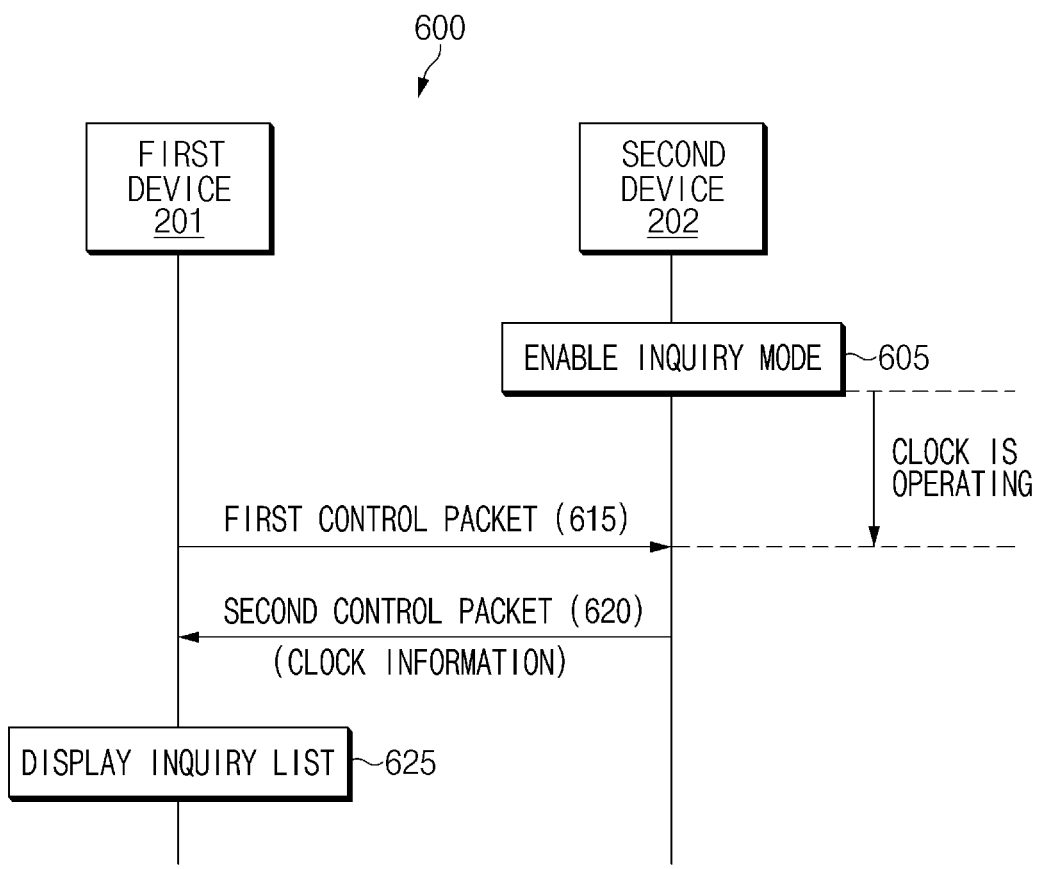
FIG. 6 is a signal flow diagram for displaying an inquiry list based on clock information according to an embodiment.

FIG. 6 is a signal flow diagram 600 for displaying an inquiry list based on clock information according to an embodiment. A second device 202 may be one of the second devices 202-1, 202-2, 202-3, 202-4, and 202-5.

Referring to FIG. 6, in step 605, the second device 202 may enable an inquiry mode. The inquiry mode may indicate a mode for performing the inquiry procedure. The enabling of the inquiry mode may indicate, for example, enabling an inquiry scan based on the Bluetooth™ legacy protocol or advertising based on the BLE protocol.

The second device 202 may enable the inquiry mode in response to the powering on of the second device 202, the powering on of the wireless communication circuit of the second device 202, or opening of a case device including the second device 202. The second device 202 may enable the inquiry mode when a user input of requesting a service through the Bluetooth™ protocol with the first device 201 is received, an application associated with the first device 201 is installed on the second device 202, or the application is executed. When the inquiry mode is enabled, a clock (e.g., the CLKN) of the second device 202 may start to operate. The clock may start from a specified value (e.g., 0×0).

In step 615, the second device 202 may receive a first control packet used for the inquiry procedure from the first device 201 while the clock is operating. For example, the first control packet may include an ID packet based on the Bluetooth™ legacy protocol or a scan request (SCAN_REQ) packet based on the BLE protocol. The first control packet may include an IAC. The first device 201 may broadcast the first control packet.

In step 620, the second device 202 may transmit a second control packet responding to the first control packet to the first device 201. The second control packet may include, for example, the FHS packet based on the Bluetooth™ legacy protocol or the scan response packet based on the BLE protocol. The second device 202 may insert, into the second control packet, clock information about a clock starting to operate from step 605. For example, the second device 202 may identify a clock value operated based on step 605 in response to the reception of the first control packet. The identified clock value may be inserted into the second control packet.

In step 625, the first device 201 may display the inquiry list indicating the inquiry result of the second device 202 based on the clock information included in the second control packet. For example, the first device 201 may display, at the top, an inquiry result of one of the second devices 202-1, 202-2, 202-3, 202-4, and 202-5 having a clock value close to the specified value among the clock value of the second device 202 and clock values of the other second devices 202-1, 202-2, 202-3, 202-4, and 202-5.

Figure 7:
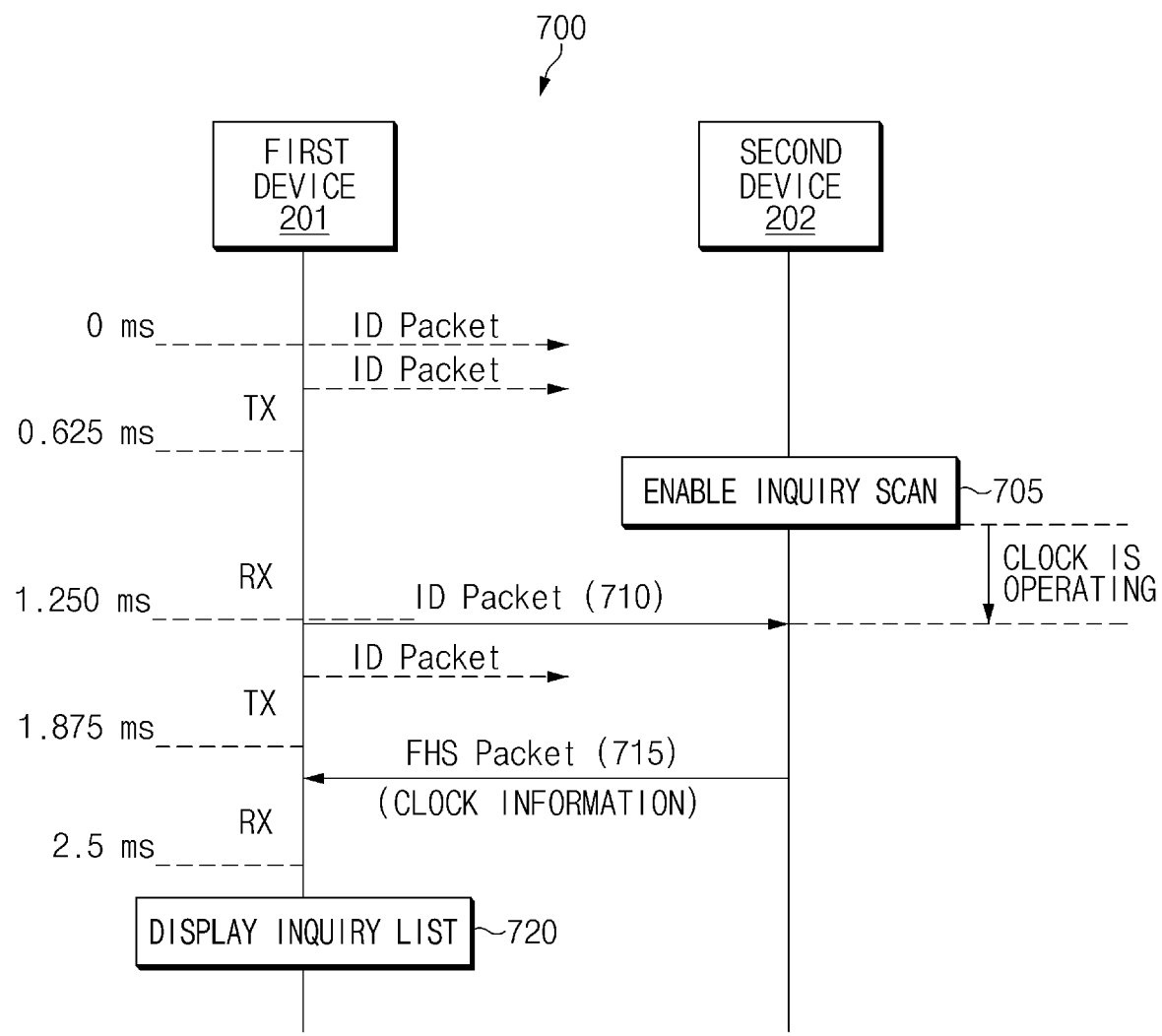
FIG. 7 is a signal flow diagram based on a Bluetooth™ legacy protocol according an embodiment.

FIG. 7 is a signal flow diagram 700 based on a Bluetooth™ legacy protocol according to an embodiment.

Referring to FIG. 7, the first device 201 and the second device 202 may perform the inquiry procedure based on the time slot. One time slot may be 0.625 ms. For example, the first device 201 may transmit (e.g., broadcast) the ID packet a plurality of times (e.g., twice) during the one time slot (e.g., a TX slot), and then attempt to receive the FHS packet during a next time slot (e.g., an RX slot). For example, the ID packet may be generated based on a general IAC (GIAC).

The first device 201 may perform the inquiry procedure based on a condition for starting the inquiry procedure. For example, the first device 201 may perform the inquiry procedure in response to the first device 201 entering a Bluetooth™ menu of a setting application, receiving a user input requesting a specific service (e.g., file sharing), installation of an application associated with the second device 202 on the first device 201, or execution of the application. The first device 201 may perform an inquiry procedure of repeating transmission of the ID packet (e.g., a TX Operation) and Opening of a reception slot (e.g., an RX operation) for a specified time (e.g. 12.8 seconds).

In step 705, the second device 202 may enable the inquiry scan. When the inquiry scan is enabled, the second device 202 may attempt to receive the ID packet including the GIAC by opening the reception slot.

The second device 202 may enable the inquiry scan when the second device 202 is powered on, the wireless communication circuit of the second device 202 is powered on, or the case device including the second device 202 is opened. In this case, when the inquiry scan is enabled, the CLKN of the second device 202 may start to operate from the specified value (e.g., 0×0). The second device 202 may enable the inquiry scan when the user input requesting the specific service (e.g. file sharing) with the first device 201 is received, the application associated with the first device 201 is installed on the second device 202, or the application is executed. In this case, the second device 202 may reset the CLKN value that is already operating to the specified value.

In step 710, the second device 202 may receive an ID packet transmitted from the first device 201 while the CLKN is operating.

In step 715, the second device 202 may transmit an FHS packet responding to the ID packet to the first device 201. The second device 202 may insert the clock information (e.g., CLKN) into the FHS packet. For example, the second device 202 may insert an increased CLKN value from when the inquiry scan is enabled until the ID packet is received (or until the transmission of the FHS packet is started) into the FHS packet.

In step 720, the first device 201 may receive the FHS packet from at least one second device 202-1, 202-2, 202-3, 202-4, and 202-5, and display the inquiry list including at least one second device 202-1, 202-2, 202-3, 202-4, and 202-5 based on the CLKN value included in the received FHS packet.

Figure 8:
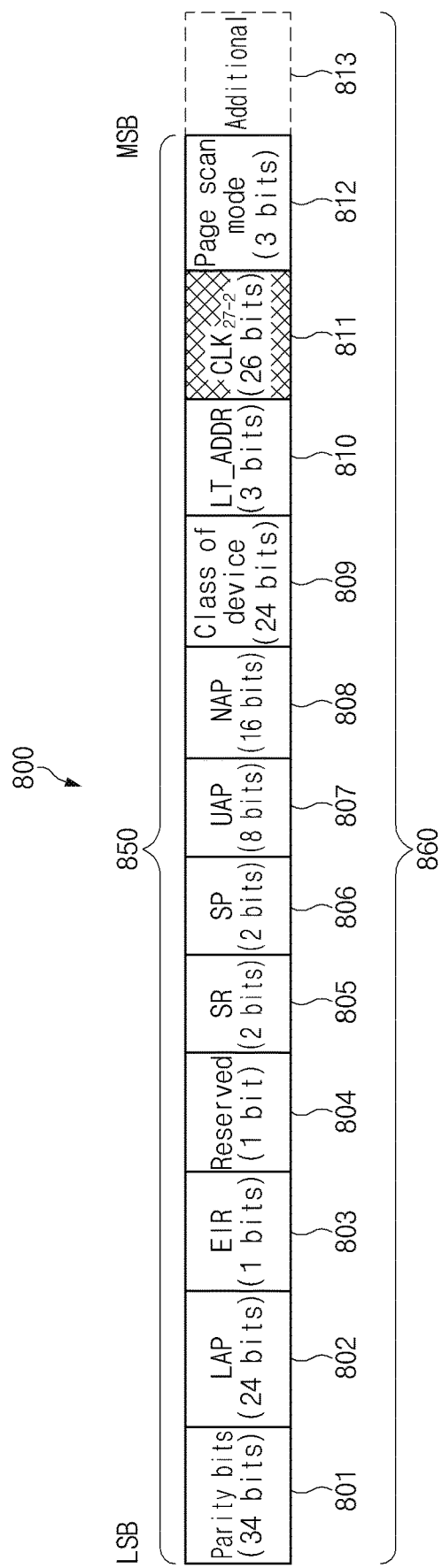
FIG. 8 is an illustration of a format of a frequency hopping synchronization (FHS) packet based on a Bluetooth™ legacy protocol according to an embodiment.

FIG. 8 is an illustration of a format of an FHS packet 800 based on a Bluetooth™ legacy protocol according to an embodiment.

Referring to FIG. 8, the data format of the FHS packet 800 may be a first data format 850 including a parity bits field 801 to a page scan mode field 812, or a second data format 860 further including an additional field 813 in the first data format 850.

At least some of the types of fields and bit sizes based on the first data format 850 may be based on the Bluetooth™ standard. For example, the FHS packet 800 may include the parity bits field 801 (e.g., 34 bits), a lower address part (LAP) field 802 (e.g., 24 bits), an extended inquiry response (EIR) field 803 (e.g., 1 bit), a reserved field 804 (e.g., 1 bit), a scan repetition (SR) field 805 (e.g., 2 bits), a scan period (SP) field 806 (e.g., 2 bits), a upper address part (UAP) field 807 (e.g., 8 bits), a non-significant address part (NAP) field 808 (e.g., 16 bits), a class of device field 809 (e.g., 24 bits), a logical transport (LT) address (LT_ADDR) field 810 (e.g., 3 bits), a $CLK_{21-2}$ field 811 (e.g., 26 bits), and the page scan mode field 812 (e.g., 3 bits).

The parity bits field 801 may be located foremost of the FHS packet and may be used for error detection. The EIR field 803 may indicate whether the second device 202 supports an EIR packet transmission function. The reserved field 804 may indicate a field not defined by the Bluetooth™ standard. The UAP field 807 and the NAP field 808 indicate a manufacturer's code (e.g., an organization unique identifier (OUI)), and the LAP field 802 may indicate a code assigned by the manufacturer. The SR field 805 may indicate an interval between successive page scan windows. The SP field 806 may indicate a scan period. The class of device field 809 may indicate a class (e.g., an earphone, a headset, a wearable device, a speaker, a mouse, a keyboard, or a display device) of the second device 202. The LT address field 810 may indicate a logical transport address used for a connection or role switch between the first device 201 and the second device 202. The $CLK_{27-2}$ field 811 may indicate a value of CLKN of the second device 202. The page scan mode field 812 may indicate which scan mode is used by the second device 202.

Because the first device 201 may display the inquiry list based on the CLKN value of the second device 202 inserted into the $CLK_{27-2}$ field 811, even when the second device 202 does not insert additional data bits, the first device 201 may identify the device that the user wants to use. When the FHS packet 800 includes the additional field 813 based on the second data format 860, the second device 202 may insert a reset clock value into the additional field 813.

Figure 9:
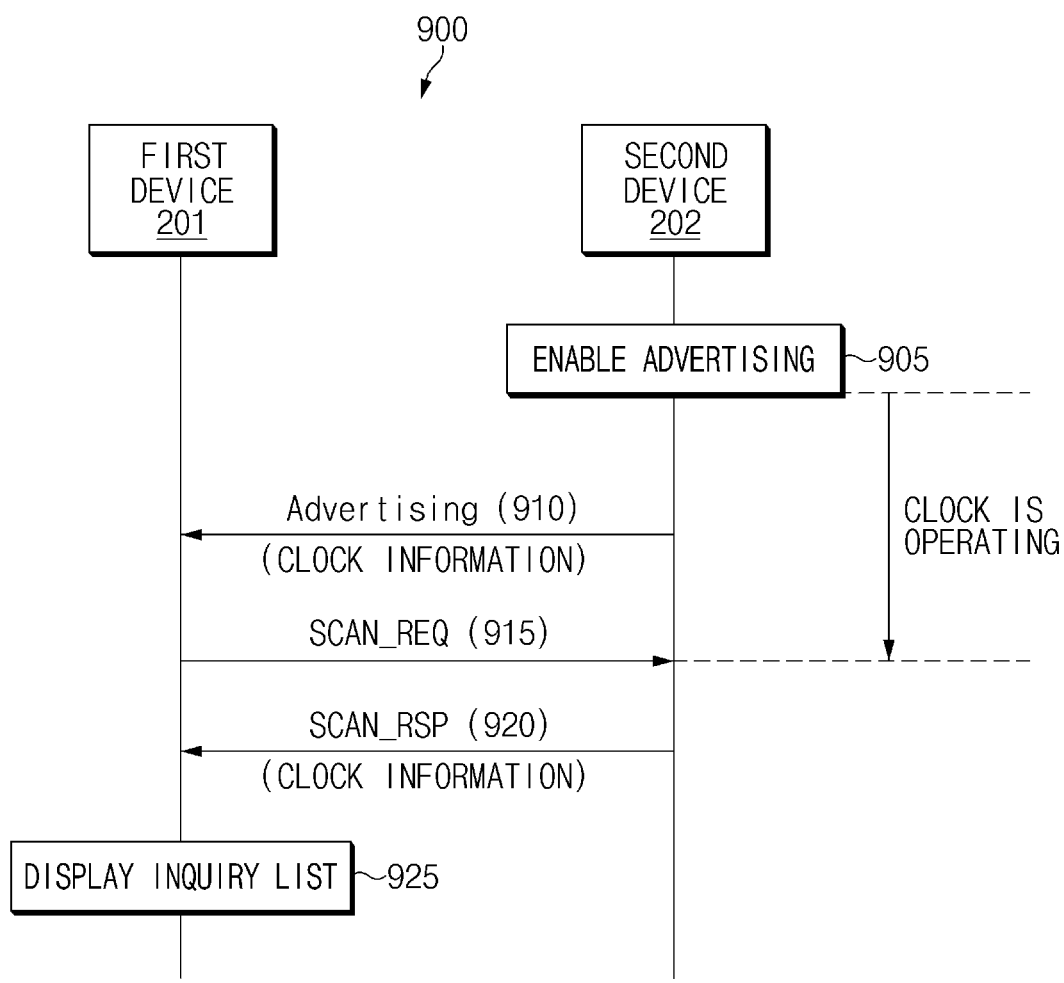
FIG. 9 is a signal flow diagram based on a Bluetooth™ low energy (BLE) protocol according to an embodiment.

FIG. 9 is a signal flow diagram 900 based on a BLE protocol according to an embodiment.

Referring to FIG. 9, the first device 201 and the second device 202 may use an active scan or a passive scan. When using the passive scan, the first device 201 and the second device 202 may omit steps 915 and 920.

The first device 201 may attempt to receive an advertising packet based on a specified interval and duty. The first device 201 may attempt to receive the advertising packet when the condition for starting the inquiry procedure described above with reference to FIG. 7 is satisfied.

In step 905, the second device 202 may enable advertising. The second device 202 may enable advertising when the second device 202 is powered on, the wireless communication circuit of the second device 202 is powered on, the case device including the second device 202 is opened, the user input of requesting the specific service (e.g. the file sharing) with the first device 201 is received, the application associated with the first device 201 is installed on the second device 202, or the application is executed. When advertising is enabled, the clock may operate.

In step 910, the second device 202 may transmit the advertising packet to the first device 201. The advertising packet may include, for example, at least one of a manufacturer ID, a device name, or a COD. The second device 202 may insert the clock information into the advertising packet.

When using the active scan, in step 915, the first device 201 may transmit a scan request packet (SCAN_REQ) to the second device 202. The second device 202 may insert an increased clock value from when the advertising is enabled until the scan request packet (SCAN_REQ) is received (or until the transmission of the scan request packet (SCAN_REQ) is started) into the scan request packet (SCAN_REQ), and in step 920, may transmit the scan response packet (SCAN_RSP) to the first device 201.

In step 925, the first device 201 may display the inquiry list based on the clock value included in the scan response packet (SCAN_RSP) received from at least one of the second device 202 (e.g., 202-1, 202-2, 202-3, 202-4, and 202-5).

Figure 10:
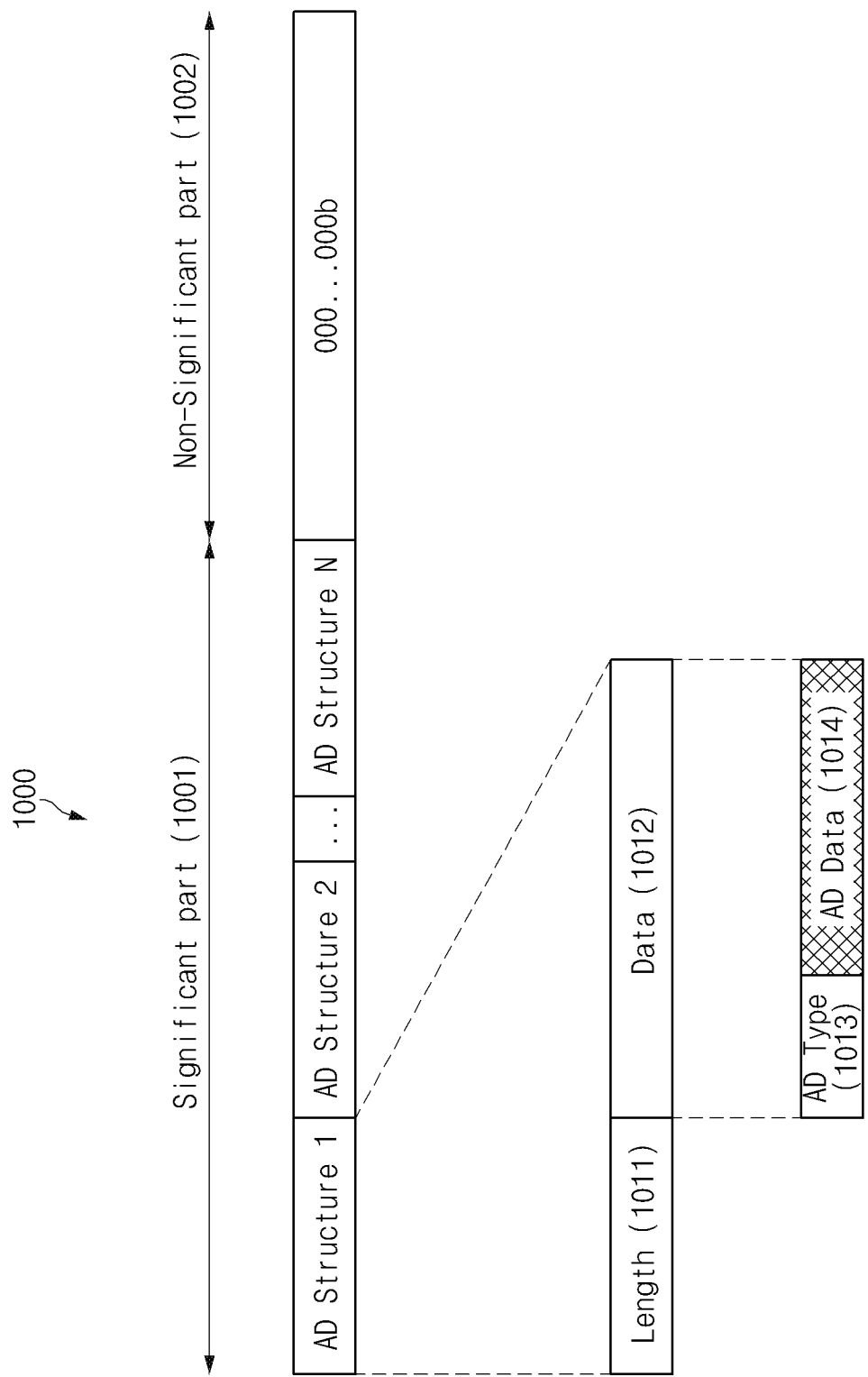
FIG. 10 is an illustration of a format of a packet based on a BLE protocol according to an embodiment.

FIG. 10 is an illustration of a format of a packet 1000 based on a BLE protocol according to an embodiment. The packet 1000 may be an advertising packet or a scan response packet (SCAN_RSP).

Referring to FIG. 10, the packet 1000 may include a significant part 1001 including N advertising structure (AD structure) fields, where N is a natural number, and a non-significant part 1002 not defined by the Bluetooth™ standard. The advertising structure field (e.g., AD Structure 1) included in the significant part 1001 may include a length field 1011 indicating a length of a field and a data field 1012. The data field 1012 may include an advertising type field 1013 including a type of the advertising packet and an advertising data field 1014. The second device 202 may insert the clock information into the advertising data field 1014.

Figure 11:
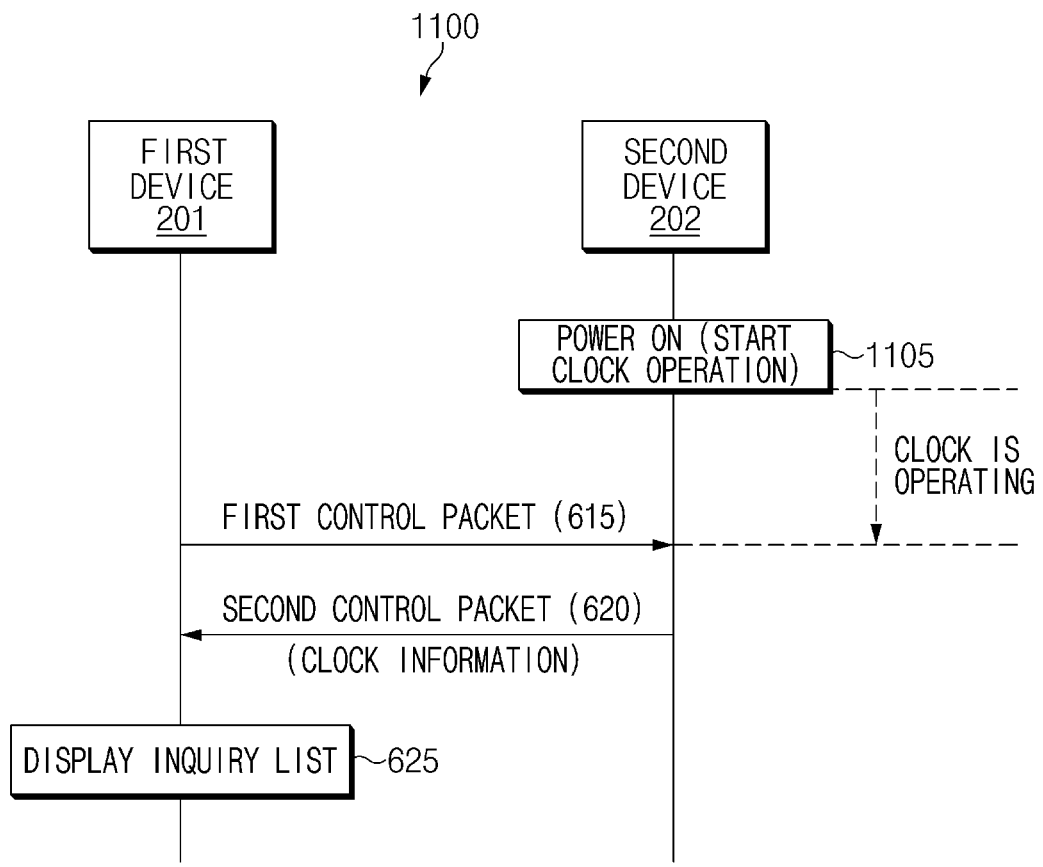
FIG. 11 is a signal flow diagram in which an operation of a clock of a second device starts according to an embodiment.
Figure 12:
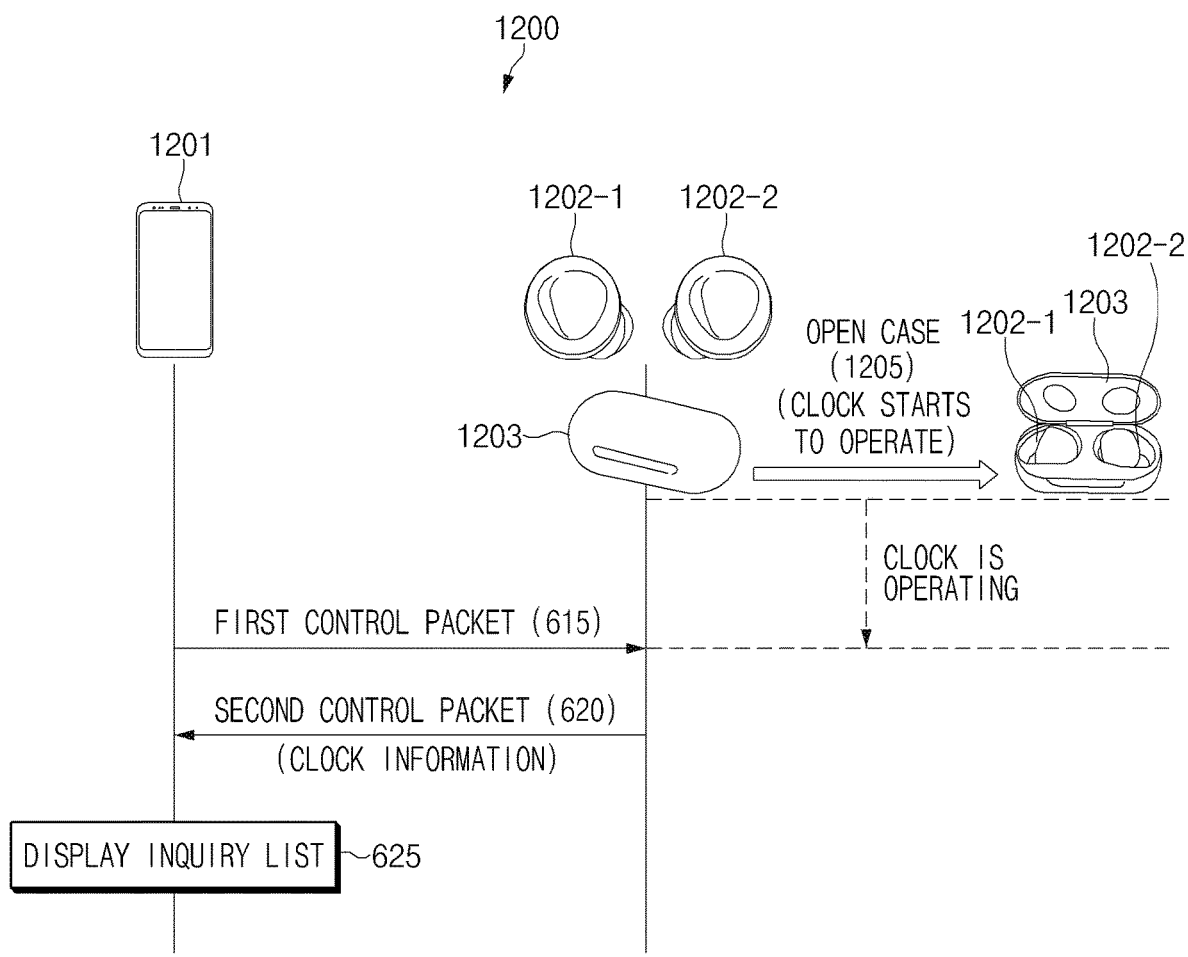
FIG. 12 is a signal flow diagram in which an operation of a clock of a second device starts according to an embodiment.

FIGS. 11 and 12 are a flowchart 1100 and a signal flow diagram 1200 in which an operation of a clock of the second device 202 starts according to an embodiment. Signal flow diagrams 1100 and 1200 may be obtained by modifying at least a portion of the signal flow diagram of FIG. 6.

Referring to FIG. 11, the second device 202 may be a user equipment or an accessory device. In step 1105, the second device 202 may be powered on or the wireless communication circuit of the second device 202 may be powered on. When the second device 202 is powered on or when the wireless communication circuit of the second device 202 is powered on, a clock may start to operate. For example, when the second device 202 is powered on, the CLKR may start to operate. For example, the CLKN may start to operate when the wireless communication circuit of the second device 202 is powered on. The wireless communication circuit of the second device 202 may be powered on when activating a pairing mode. For example, when a user input (e.g., a long touch) of pressing a button placed on one side for a specified time is received while the second device 202 is powered on, the wireless communication circuit of the second device 202 may be powered on. When the second device 202 or the wireless communication circuit of the second device 202 is powered on, the clock may operate from 0×0.

In step 615, the second device 202 may receive, from the first device 201, the first control packet used for the inquiry procedure while the clock is operating. In step 620, the second device 202 may transmit the second control packet responding to the first control packet to the first device 201. The second device 202 may insert, into the second control packet, the clock information about the clock starting to operate from step 1105. In step 625, the first device 201 may display the inquiry list indicating the inquiry result of the second device 202 based on the clock information included in the second control packet.

Referring to FIG. 12, at least one accessory device 1202-1 or 1202-2, which may be the second device 202, may be inserted into a case device 1203. The accessory device 1202-1 or 1202-2 may include, for example, a wireless earphone. In step 1205, the case device 1203 into which the at least one accessory device 1202-1 or 1202-2 is inserted may be opened. When the case device 1203 is opened, a clock of the at least one accessory device 1202-1 or 1202-2 may start to operate. When the at least one accessory device 1202-1 or 1202-2 is detached from the case device 1203, or when a user input (e.g., the long touch) of pressing a button disposed on one side of the case device 1203 for a specified time is received, the clock of the at least one accessory device 1202-1 or 1202-2 may start to operate. The clock may start to operate from 0×0.

In step 615, the at least one accessory device 1202-1 or 1202-2 may receive, from the first device 1201, the first control packet used for the inquiry procedure while the clock is operating. In step 620, the at least one accessory device 1202-1 or 1202-2 may transmit the second control packet corresponding to the first control packet to the first device 1201. The at least one accessory device 1202-1 or 1202-2 may insert, into the second control packet, the clock information about the clock starting to operate at a point in time of step 1205 (or at a point in time when the at least one accessory device 1202-1 or 1202-2 is detached from the case device 1203 or at a point in time when the user input of pressing the button disposed on one side of the case device 1203 for the specified time is received). In step 625, the first device 1201 may display the inquiry list indicating the inquiry result of the at least one accessory device 1202-1 or 1202-2 based on the clock information included in the second control packet.

Figure 13A:
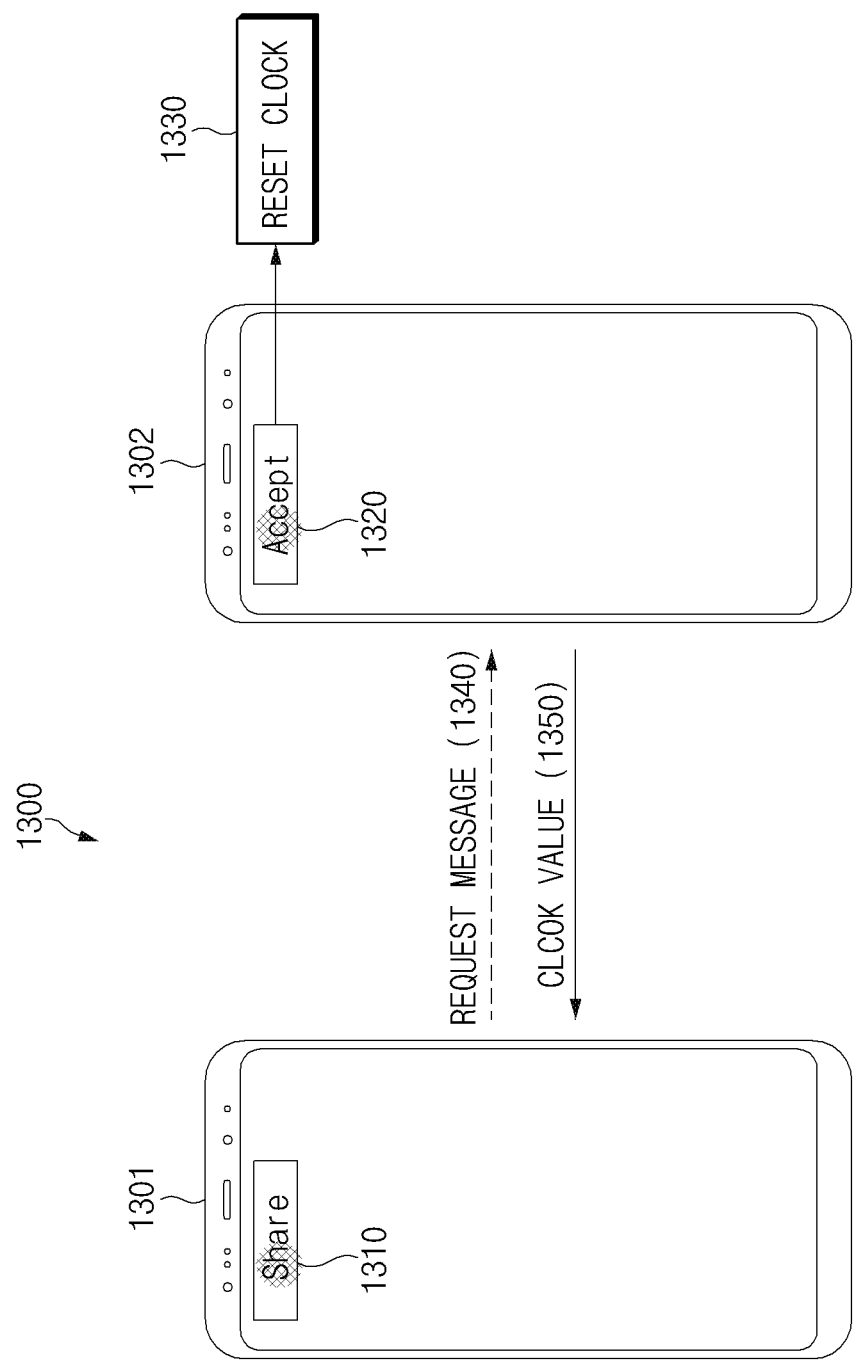
FIG. 13A is an illustration of an operation scenario for resetting a clock according to an embodiment.
Figure 13B:
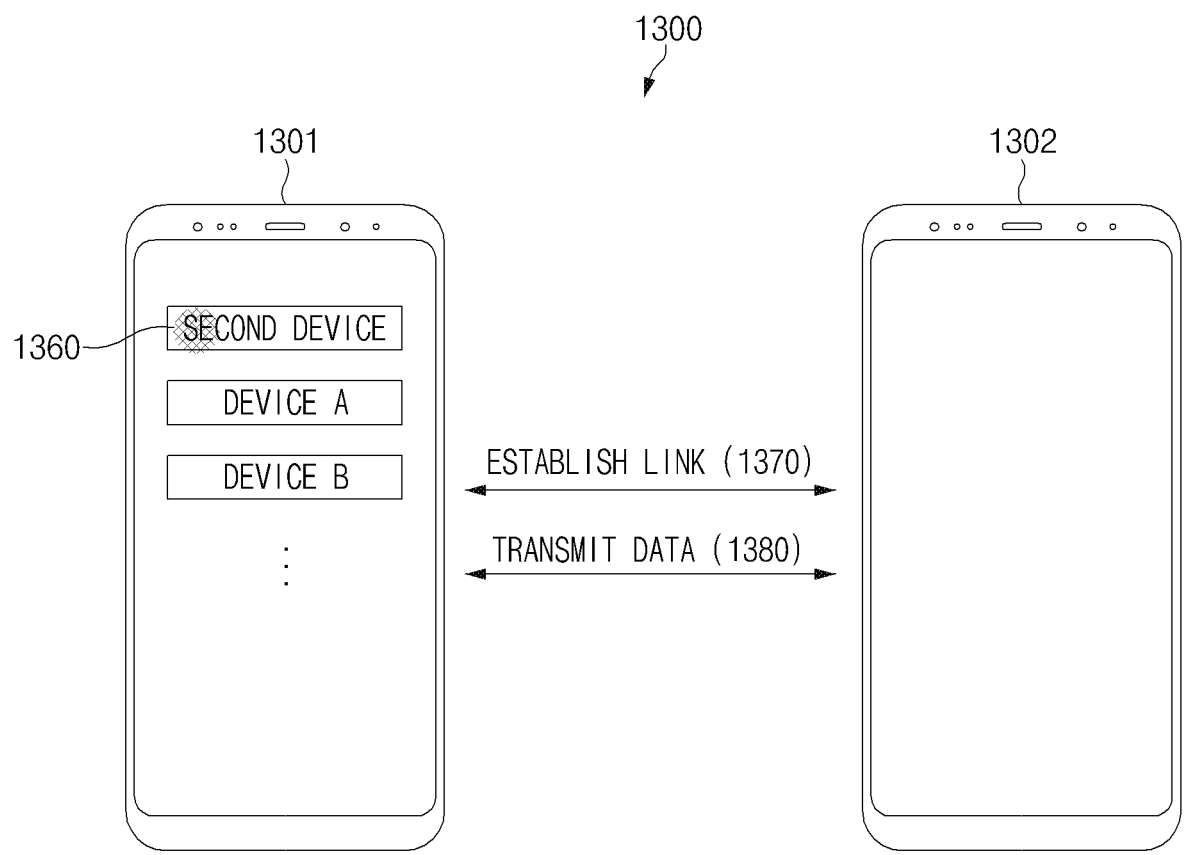
FIG. 13B is an illustration of an operation scenario for resetting a clock according to an embodiment.

FIGS. 13A and 13B illustrate an operation scenario 1300 of resetting a clock according to an embodiment. A first device 1301 and a second device 1302 may each be a user equipment.

Referring to FIG. 13A, the first device 1301 may receive a user input 1310 of requesting file sharing with the second device 1302. The second device 1302 may receive a user input 1320 that accepts the file sharing with the first device 1301. In FIG. 13A, the first device 1301 requests the file sharing, but the second device 1302 may request the file sharing and the first device 1301 may accept the file sharing. In response to the user input 1320 being received, the second device 1302 may reset the clock (e.g., the CLKN) operating in step 1330 to a specified value.

For example, the first device 1301 may display a plurality of images in response to a user input of executing a gallery application. The first device 1301 may receive a user input of selecting at least one of the plurality of displayed images, and receive a user input 1310 of inquiring about the second device 1302 for sharing the at least one selected image. The second device 1302 may execute the gallery application, and receive a user input 1320 of requesting to receive the at least one image from the first device 1301 while an execution screen of the gallery application is displayed.

In step 1340, the first device 1301 may transmit a request message to the second device 1302. The request message may include, for example, at least one of an ID packet and a scan request packet, or may include a separate packet. The first device 1301 may transmit the request message in response to the reception of the user input 1310.

In response to the reception of the request message, in step 1350, the second device 1302 may transmit a reset clock value to the first device 1301. For example, the second device 1302 may transmit the clock value through an FHS packet, an advertising packet, or a scan response packet, or through a separate packet. In this case, the second device 1302 may transmit an increased clock value from when the clock is reset until when the request message is received.

An order of at least some operations illustrated in FIG. 13A may be changed or omitted. Step 1340 may be omitted. For example, the second device 1302 may reset the clock in response to the reception of the user input 1320 in step 1330, and transmit the reset clock value to the first device 1301 without waiting for the request message. After the second device 1302 resets the clock in response to the reception of the user input 1320 in step 1330, the first device 1301 may receive the user input 1310, and then transmit the request message to the second device 1302 in step 1340. When the first device 1301 transmits the request message in response to the user input 1310 in step 1340, the second device 1302 that received the request message may receive the user input 1320 that accepts the file sharing reset the clock in step 1330, and transmit the reset clock value to the first device 1301 in step 1350.

Referring to FIG. 13B, the first device 1301 may display an inquiry result of the second device 1302 on the display using the received clock value. For example, when the clock value of the second device 1302 is closest to the specified value, the first device 1301 may output the inquiry result of the second device 1302 above inquiry results of other devices (e.g., device A and device B).

In step 1360, the first device 1301 may receive a user input 1360 of selecting the second device 1302 through the display. In step 1370, the first device 1301 may establish a link based on the Bluetooth™ protocol with the second device 1302 in response to the user input 1360. When the establishment of the link is completed, in step 1380, the first device 1301 and the second device 1302 may transmit data to another person's device through the link.

Figure 14:
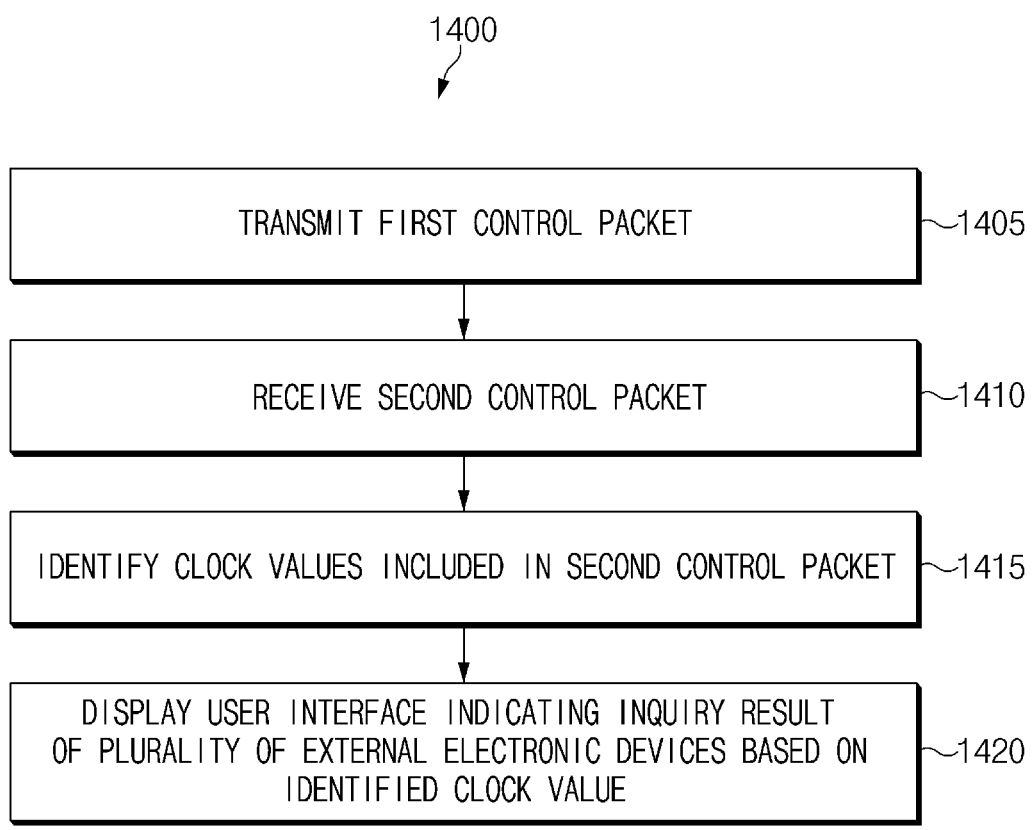
FIG. 14 is a flowchart of a method of an electronic device for displaying an inquiry list according to an embodiment.

FIG. 14 is a flowchart 1400 of a method of an electronic device of displaying an inquiry list according to an embodiment. Operations shown in FIG. 14 may be performed by the electronic device or may be performed by a component included in the electronic device.

Referring to FIG. 14, in step 1405, the electronic device may transmit a first control packet used for an inquiry procedure through a processor and a wireless communication circuit. The first control packet may include, for example, an ID packet based on the Bluetooth™ legacy protocol or a scan request packet based on the BLE protocol.

In step 1410, the electronic device may receive a second control packet responding to the first control packet through the processor and the wireless communication circuit. The second control packet may include, for example, an FHS packet based on the Bluetooth™ legacy protocol or a scan response packet based on the BLE protocol. The electronic device may receive the second control packet from a plurality of external electronic devices.

In step 1415, the electronic device may identify clock values of the external electronic devices included in the second control packet through the processor. For example, when the wireless communication circuit receives the second control packet, the wireless communication circuit may transmit the second control packet (or the clock value included in the second control packet) to the processor.

In step 1420, the electronic device may display a user interface indicating inquiry results of the plurality of external electronic devices based on the clock values identified through the processor. For example, the electronic device may display the inquiry results of the external electronic devices sequentially and vertically and descendingly in an order of differences between the clock values and the specified value, from the smallest difference to the largest difference.

Figure 15:
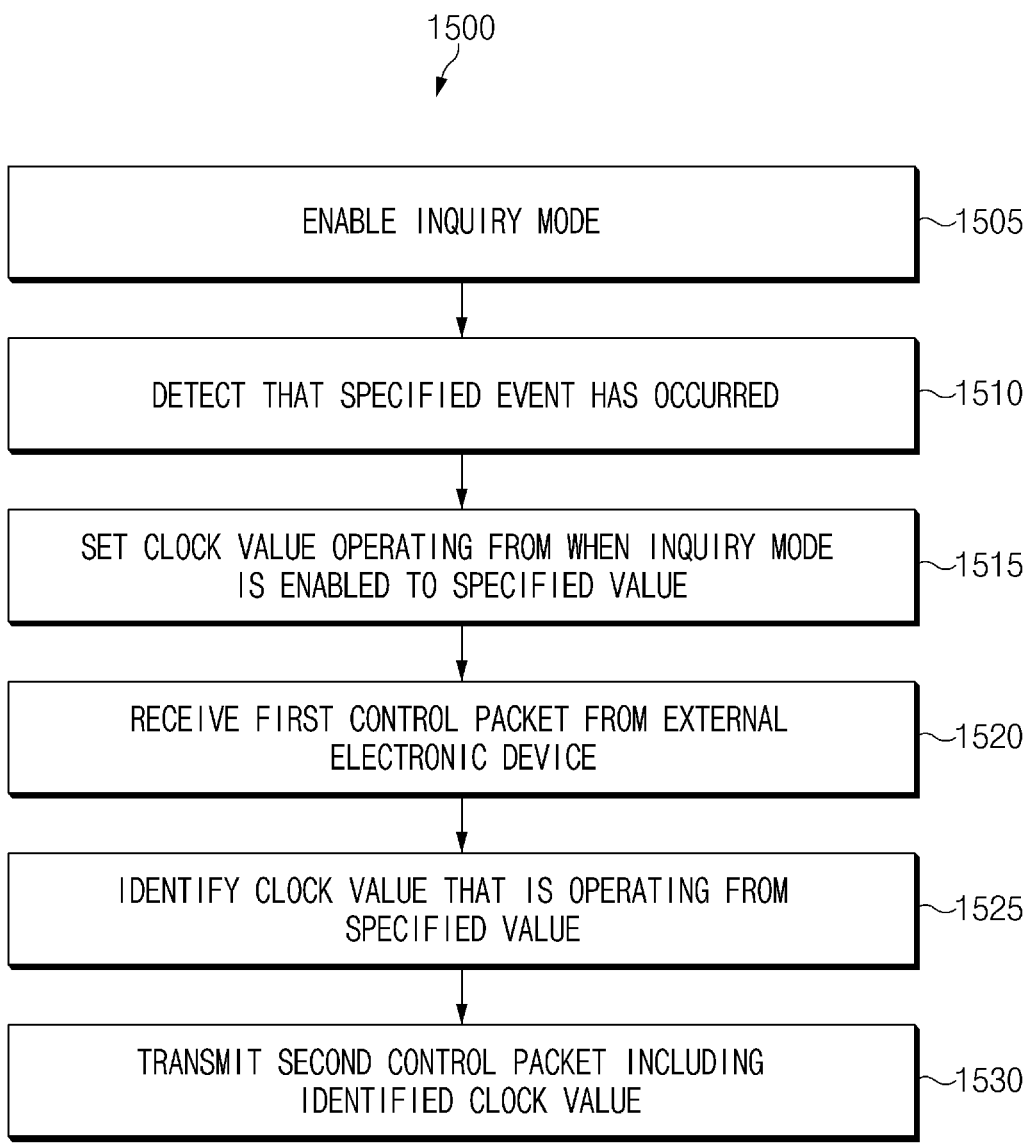
FIG. 15 is a flowchart of a method of an electronic device for transmitting clock information according to an embodiment.

FIG. 15 is a flowchart 1500 of a method of an electronic device of transmitting clock information according to an embodiment. Operations illustrated in FIG. 15 may be performed by the electronic device or may be performed by a component included in the electronic device.

Referring to FIG. 15, in step 1505, the electronic device may enable an inquiry mode through a wireless communication circuit. The inquiry mode may include, for example, an inquiry scan based on the Bluetooth™ legacy protocol, or an advertisement based on the BLE protocol. The electronic device may enable the inquiry mode in response to powering on the electronic device, powering on the wireless communication circuit of the electronic device, or opening a case device including the electronic device. When the inquiry mode is enabled, a clock of the electronic device may start to operate (or count).

In step 1510, the electronic device may detect that a specified event has occurred. For example, the electronic device may detect that a user input of requesting file sharing is received, an application associated with the external electronic device is installed on the electronic device, or the application is executed.

In step 1515, the electronic device may set a clock value of the electronic device operating from when the inquiry mode is enabled to the specified value through the wireless communication circuit. In this case, the clock may execute from the specified value.

In step 1520, the electronic device may receive a first control packet used for the inquiry procedure from the external electronic through the wireless communication circuit.

In response to the reception of the first control packet, in step 1525, the electronic device may identify a clock value that is operating from the specified value.

In step 1530, the electronic device may transmit a second control packet including the identified clock value, in response to the first control packet, to the external electronic device.

According to an embodiment, an electronic device may include a display, a wireless communication circuit that supports a Bluetooth™ protocol, at least one processor operatively connected with the display and the wireless communication circuit, and a memory operatively connected to the at least one processor, wherein the memory may store instructions that, when executed, cause the at least one processor to broadcast a first control packet used for an inquiry procedure through the wireless communication circuit, receive a plurality of second control packets responding to the first control packet through the wireless communication circuit, identify a plurality of clock values included in the plurality of received second control packets, and display, on the display, a user interface indicating inquiry results of a plurality of external electronic devices that transmitted the plurality of second control packets based on the identified plurality of clock values.

The instructions may cause the at least one processor to compare the identified clock values with a specified value to obtain differences between the identified clock values and the specified value, and control the display to display the inquiry results of the plurality of external electronic devices sequentially, vertically, and descendingly in an order from the smallest difference to the largest difference.

The instructions may cause the at least one processor to control the display to display the user interface indicating the inquiry results of the plurality of external electronic devices based on at least one of an order of received signal strengths of the plurality of second control packets and an alphabetical order indicating device names included in the plurality of second control packets.

The instructions may cause the at least one processor to sort the plurality of external electronic devices into a first group having the received signal strength greater than or equal to a threshold value and a second group having the received signal strength less than the threshold value, control the display to display inquiry results of external electronic devices included in the first group above inquiry results of external electronic devices included in the second group, and obtain differences between the plurality of clock values of the external electronic devices included in the first group and the specified value and control the display to display the inquiry results of the plurality of external electronic devices included in the first group sequentially and vertically and descendingly in an order from the smallest difference to the largest difference.

The wireless communication circuit may support a Bluetooth™ legacy protocol, the first control packet may include an ID packet based on the Bluetooth™ legacy protocol, and the plurality of second control packets may include an FHS packet responding to the ID packet.

The instructions may cause the at least one processor to control the display to display the user interface indicating the inquiry results of the plurality of external electronic devices based on a CLKN (a native clock) value included in the FHS packet.

The wireless communication circuit may support a BLE protocol, the first control packet may include a scan request (SCAN_REQ) packet based on the BLE protocol, and the plurality of second control packets may include a scan response (SCAN_RSP) packet in response to the scan request packet.

The instructions may cause the at least one processor to enable the wireless communication circuit in response to reception of a user input of requesting file sharing, installation of an application associated with the external electronic device on the electronic device, or detection of execution of the application, and transmit the first control packet through the enabled wireless communication circuit.

According to an embodiment, an electronic device may include a wireless communication circuit that supports a Bluetooth™ protocol, and the wireless communication circuit may enable an inquiry mode based on the Bluetooth™ protocol, set, to a specified value, a clock value of the electronic device in operation from when the inquiry mode is enabled in response to an occurrence of a specified event, receive a first control packet used for an inquiry procedure from an external electronic device, identify the clock value of the electronic device operating from the specified value in response to the reception of the first control packet, and transmit a second control packet including the identified clock value to the external electronic device.

The wireless communication circuit may enable the inquiry mode in response to powering on the electronic device, powering on the wireless communication circuit, or opening of a case device including the electronic device.

The specified event may occur when a user input of requesting file sharing is received, an application associated with the external electronic device is installed on the electronic device, or the application is executed.

The wireless communication circuit may support a Bluetooth™ legacy protocol, the first control packet may include an ID packet based on the Bluetooth™ legacy protocol, and a second control packet may include an FHS packet in response to the ID packet.

The wireless communication circuit may support a BLE protocol, the first control packet may include a scan request packet based on the BLE protocol, and the second control packet may include a scan response packet in response to the scan request packet.

According to an embodiment, a method of an electronic device may include broadcasting a first control packet used for an inquiry procedure based on a Bluetooth™ protocol, receiving a plurality of second control packets responding to the first control packet, identifying a plurality of clock values included in the plurality of received second control packets, and displaying a user interface indicating inquiry results of a plurality of external electronic devices that transmitted the plurality of second control packets based on the identified plurality of clock values.

Displaying the user interface may include comparing the identified clock values with a specified value to obtain differences between the identified clock values and the specified value, and displaying the inquiry results of the plurality of external electronic devices sequentially, vertically, and descendingly in an order from the smallest difference to the largest difference.

Displaying the user interface may include displaying inquiry results of the plurality of external electronic devices sequentially, vertically, and descendingly based on at least one of an order of received signal strengths of the plurality of second control packets or an alphabetical order indicating device names included in the plurality of second control packets.

Displaying the user interface may include sorting the plurality of external electronic devices into a first group having the received signal strength greater than or equal to a threshold value and a second group having the received signal strength less than the threshold value, and displaying inquiry results of external electronic devices included in the first group above inquiry results of external electronic devices included in the second group, obtaining differences between the plurality of clock values of the external electronic devices included in the first group and the specified value, and displaying the inquiry results of the plurality of external electronic devices included in the first group sequentially, vertically and descendingly in an order from the smallest difference to the largest difference.

Broadcasting the first control packet may include transmitting the first control packet in response to reception of a user input of requesting file sharing, installation of an application associated with the external electronic device on the electronic device, or detection of execution of the application The Bluetooth™ protocol may include a Bluetooth™ legacy protocol, the first control packet may include an ID packet based on the Bluetooth™ legacy protocol, and the plurality of second control packets may include an FHS packet in response to the ID packet.

The Bluetooth™ protocol may include a BLE protocol, the first control packet may include a scan request packet based on the BLE protocol, and the plurality of second control packets may include a scan response packet responding to the scan request packet.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device may provide an environment in which a user may easily select an external electronic device by displaying an external electronic device having a high possibility of connection in the Bluetooth™ network environment at a high rank of an inquiry list.

Even when the external electronic device does not insert additional bit information, the electronic device may sort the plurality of external electronic devices by displaying the plurality of external electronic devices inquired using information previously defined in the Bluetooth™ protocol.

In addition, various effects that are identified directly or indirectly through the disclosure may be provided.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display;
   a wireless communication circuit configured to support a protocol capable of short-range wireless communication between electronic devices;
   at least one processor operatively connected with the display and the wireless communication circuit; and
   a memory operatively connected to the at least one processor, wherein the memory is configured to store instructions that, when executed, cause the at least one processor to:
   broadcast a first control packet used for an inquiry procedure through the wireless communication circuit,
   receive a plurality of second control packets in response to the first control packet through the wireless communication circuit,
   identify a plurality of clock values in the plurality of second control packets, and
   display, on the display, a user interface indicating inquiry results of a plurality of external electronic devices that transmitted the plurality of second control packets based on the plurality of clock values.

2. The electronic device of claim 1, wherein the memory is further configured to store instructions that, when executed, cause the at least one processor to:

compare the plurality of clock values with a specified value to obtain differences between the plurality of clock values and the specified value, and control the display to display the inquiry results of the plurality of external electronic devices sequentially, vertically, and descendingly in an order from a smallest difference to a largest difference.

3. The electronic device of claim 2, wherein the memory is further configured to store instructions that, when executed, cause the at least one processor to:

control the display to display the user interface indicating the inquiry results of the plurality of external electronic device further based on at least one of an order of received signal strengths of the plurality of second control packets and an alphabetical order indicating device names in the plurality of second control packets.

4. The electronic device of claim 3, wherein the memory is further configured to store instructions that, when executed, cause the at least one processor to:

sort the plurality of external electronic devices into a first group having the received signal strengths greater than or equal to a threshold value and a second group having the received signal strengths less than the threshold value, control the display to display inquiry results of the plurality of external electronic devices in the first group above inquiry results of the plurality of external electronic devices in the second group, and obtain differences between the plurality of clock values of the plurality of external electronic devices in the first group and the specified value and control the display to display the inquiry results of the plurality of external electronic devices in the first group sequentially, vertically, and descendingly in an order from a smallest difference between the plurality of clock values of the plurality of external electronic devices in the first group and the specified value to a largest difference between the plurality of clock values of the plurality of external electronic devices in the first group and the specified value.

5. The electronic device of claim 1, wherein the wireless communication circuit is further configured to support a legacy protocol capable of short-range wireless communication between electronic devices, wherein the first control packet comprises an identification (ID) packet based on the legacy protocol, and wherein the plurality of second control packets comprises a frequency hopping synchronization (FHS) packet in response to the ID packet.

6. The electronic device of claim 5, wherein the memory is further configured to store instructions that, when executed, cause the at least one processor to:

control the display to display the user interface indicating the inquiry results of the plurality of external electronic devices based on a native clock (CLKN) value in the FHS packet.

7. The electronic device of claim 1, wherein the wireless communication circuit is further configured to support a low energy protocol capable of short-range wireless communication between electronic devices, wherein the first control packet comprises a scan request (SCAN_REQ) packet based on the low energy protocol, and wherein the plurality of second control packets comprises a scan response (SCAN_RSP) packet in response to the scan request packet.

8. The electronic device of claim 1, wherein the memory is further configured to store instructions that, when executed, cause the at least one processor to:

enable the wireless communication circuit in response to reception of a user input of requesting file sharing, installation of an application associated with each of the plurality of external electronic devices on the electronic device, or detection of execution of the application; and transmit the first control packet through the wireless communication circuit.

9. An electronic device, comprising:
a wireless communication circuit configured to:
support a protocol capable of short-range wireless communication between electronic devices,
enable an inquiry mode based on the protocol,
reset, to a specified value, a clock value of a clock of the electronic device that was in operation from when the inquiry mode is enabled in response to an occurrence of a specified event,
receive a first control packet used for an inquiry procedure from an external electronic device,
identify the clock value of the electronic device operating from the specified value in response to receiving the first control packet, and
transmit a second control packet comprising the clock value to the external electronic device.

10. The electronic device of claim 9, wherein the wireless communication circuit is further configured to:

enable the inquiry mode in response to powering on the electronic device, powering on the wireless communication circuit, or opening a case device comprising the electronic device.

11. The electronic device of claim 9, wherein the specified event occurs when a user input of requesting file sharing is received by the electronic device, an application associated with the external electronic device is installed on the electronic device, or the application is executed.

12. The electronic device of claim 9, wherein the wireless communication circuit is further configured to support a legacy protocol capable of short-range wireless communication between electronic devices, wherein the first control packet comprises an identification (ID) packet based on the legacy protocol, and wherein the second control packet comprises a frequency hopping synchronization (FHS) packet in response to the ID packet.

13. The electronic device of claim 9, wherein the wireless communication circuit is further configured to support a low energy protocol capable of short-range wireless communication between electronic devices, wherein the first control packet comprises a scan request packet based on the low energy protocol, and wherein the second control packet comprises a scan response packet in response to the scan request packet.

14. A method of an electronic device, comprising:
broadcasting a first control packet used for an inquiry procedure based on a protocol capable of short-range wireless communication between electronic devices;
receiving a plurality of second control packets in response to the first control packet;
identifying a plurality of clock values in the plurality of second control packets; and
displaying a user interface indicating inquiry results of a plurality of external electronic devices that transmitted the plurality of second control packets based on the plurality of clock values.

15. The method of claim 14, wherein displaying the user interface comprises:
comparing the plurality of clock values with a specified value to obtain differences between the plurality of clock values and the specified value, and displaying the inquiry results of the plurality of external electronic devices sequentially, vertically, and descendingly in an order from a smallest difference to a largest difference.

16. The method of claim 15, wherein displaying the user interface further comprises:
displaying inquiry results of the plurality of external electronic devices sequentially, vertically, and descendingly further based on at least one of an order of received signal strengths of the plurality of second control packets or an alphabetical order indicating device names in the plurality of second control packets.

17. The method of claim 16, wherein displaying the user interface further comprises:
sorting the plurality of external electronic devices into a first group having the received signal strengths greater than or equal to a threshold value and a second group having the received signal strengths less than the threshold value; and
displaying inquiry results of the plurality of external electronic devices in the first group above inquiry results of the plurality of external electronic devices in the second group, obtaining differences between the plurality of clock values of the plurality of external electronic devices in the first group and the specified value, and displaying the inquiry results of the plurality of external electronic devices in the first group sequentially, vertically, and descendingly in an order from a smallest difference between the plurality of clock values of the plurality of external electronic devices in the first group and the specified value to a largest difference between the plurality of clock values of the plurality of external electronic devices in the first group and the specified value.

18. The method of claim 14, wherein broadcasting the first control packet comprises:
transmitting the first control packet in response to reception of a user input of requesting file sharing, installation of an application associated with the external electronic device on the electronic device, or detection of execution of the application.

19. The method of claim 14, wherein the protocol comprises a legacy protocol capable of short-range wireless communication between electronic devices,
wherein the first control packet comprises an identification (ID) packet based on the legacy protocol, and
wherein the plurality of second control packets comprises a frequency hopping synchronization (FHS) packet in response to the ID packet.

20. The method of claim 14, wherein the protocol comprises a low energy protocol capable of short-range wireless communication between electronic devices,
wherein the first control packet comprises a scan request packet based on the low energy protocol, and
wherein the plurality of second control packets comprises a scan response packet in response to the scan request packet.

* * * * *